US011510040B2

(12) United States Patent
Kersey et al.

(10) Patent No.: US 11,510,040 B2
(45) Date of Patent: Nov. 22, 2022

(54) METHOD AND AN AEROSOL DELIVERY DEVICE FOR TRANSMITTING AEROSOL DELIVERY DEVICE INFORMATION

(71) Applicant: Nicoventures Trading Limited, London (GB)

(72) Inventors: Robert Kersey, Brighton (GB); Darryl Baker, London (GB); Patrick Moloney, London (GB); Maurice Ezeoke, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 16/610,587

(22) PCT Filed: May 1, 2018

(86) PCT No.: PCT/EP2018/061086
§ 371 (c)(1),
(2) Date: Nov. 4, 2019

(87) PCT Pub. No.: WO2018/202651
PCT Pub. Date: Nov. 8, 2018

(65) Prior Publication Data
US 2020/0060347 A1 Feb. 27, 2020

(30) Foreign Application Priority Data
May 3, 2017 (GB) ..................... 1707050

(51) Int. Cl.
*H04W 4/80* (2018.01)
*A24F 40/65* (2020.01)
*H04W 84/18* (2009.01)
(52) U.S. Cl.
CPC .............. *H04W 4/80* (2018.02); *A24F 40/65* (2020.01); *H04W 84/18* (2013.01)

(58) Field of Classification Search
CPC .......... A24F 40/65; H04W 4/80; H04W 84/18
See application file for complete search history.

(56) References Cited

U.S. PATENT DOCUMENTS

| 10,349,675 B2 | 7/2019 | Choukroun et al. |
| 2004/0047319 A1 | 3/2004 | Elg |

(Continued)

FOREIGN PATENT DOCUMENTS

| CN | 1631013 A | 6/2005 |
| CN | 1633780 A | 6/2005 |

(Continued)

OTHER PUBLICATIONS

IEEE 802.11, IEEE Standard, 2 pages, as retrieved on Feb. 19, 2018.

(Continued)

*Primary Examiner* — David Bilodeau
(74) *Attorney, Agent, or Firm* — Patterson Thuente Pedersen, P.A.

(57) ABSTRACT

A method for an aerosol delivery device may include storing, during use of the aerosol delivery device and in a memory of the aerosol delivery device, information recording usage characteristics of the aerosol delivery device. The method may further include creating, using a wireless communication interface of the aerosol delivery device, a connectionless-state advertising packet that includes information relating to an identity and advertising state of the aerosol delivery device and a first set of information recording usage characteristics of the aerosol delivery device from the memory; and transmitting the advertising packet via the wireless communication interface. The method may further include receiving a connectionless-state request packet from a remote wireless device, via the wireless communication interface; and responsive to receiving the request packet, creating, using the wireless communication interface, a connectionless state response packet that that includes a (Continued)

US 11,510,040 B2

Figure 1:
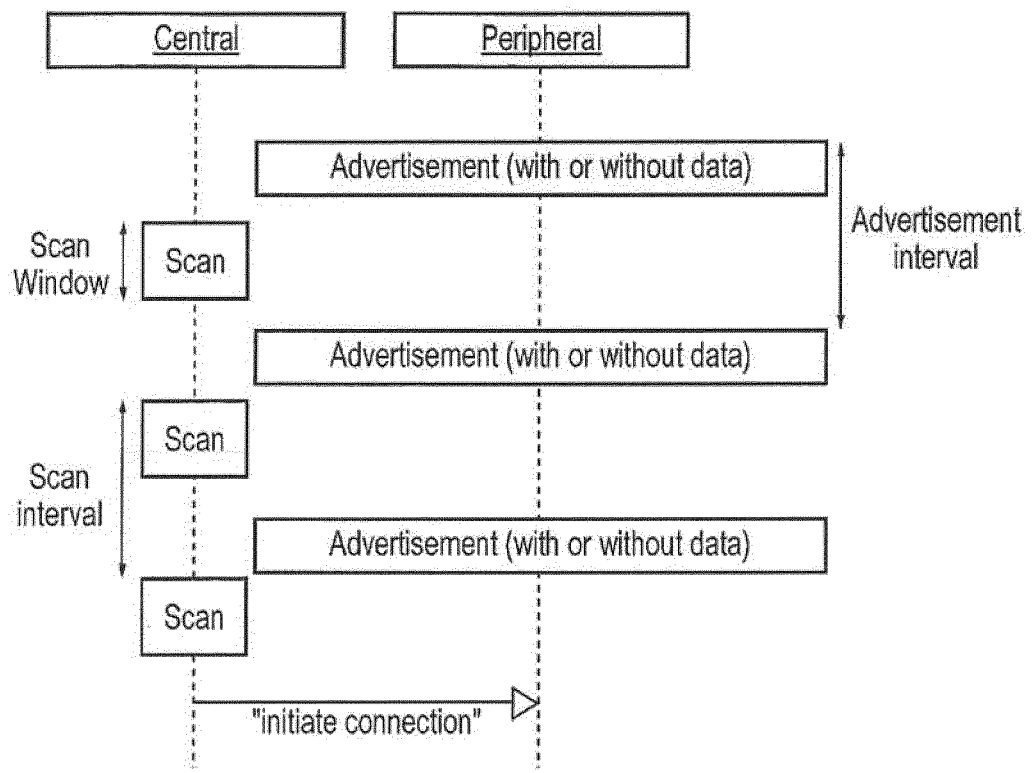

Page 2 second set of information recording usage characteristics of the aerosol delivery device from the memory.

17 Claims, 4 Drawing Sheets

(56) References Cited

U.S. PATENT DOCUMENTS

| | | | |
|---|---|---|---|
| 2011/0021142 A1 | 1/2011 | Desai | |
| 2011/0265806 A1* | 11/2011 | Alarcon | A24F 40/65 131/273 |
| 2012/0196534 A1* | 8/2012 | Kasslin | H04W 4/06 455/41.2 |
| 2013/0065584 A1 | 3/2013 | Lyon | |
| 2013/0178160 A1 | 7/2013 | Wang | |
| 2013/0276799 A1 | 10/2013 | Davidson et al. | |
| 2013/0284192 A1 | 10/2013 | Peleg et al. | |
| 2013/0340775 A1* | 12/2013 | Juster | A24F 40/65 131/273 |
| 2014/0020697 A1 | 1/2014 | Liu | |
| 2014/0060528 A1 | 3/2014 | Liu | |
| 2014/0107815 A1 | 4/2014 | Lamothe | |
| 2014/0169599 A1 | 6/2014 | Solum et al. | |
| 2014/0174459 A1 | 6/2014 | Burstyn | |
| 2014/0202477 A1 | 7/2014 | Qi et al. | |
| 2014/0278250 A1 | 9/2014 | Smith et al. | |
| 2014/0378057 A1* | 12/2014 | Ramon | H04L 9/3236 455/41.2 |
| 2015/0099469 A1 | 4/2015 | Goldstein | |
| 2015/0101625 A1 | 4/2015 | Newton et al. | |
| 2015/0101940 A1 | 4/2015 | Ash | |
| 2015/0133054 A1* | 5/2015 | Chen | H04W 8/005 455/41.2 |
| 2015/0142387 A1* | 5/2015 | Alarcon | A61M 15/0083 702/187 |
| 2015/0172391 A1 | 6/2015 | Kasslin | |
| 2015/0216237 A1 | 8/2015 | Wensley et al. | |
| 2015/0224268 A1 | 8/2015 | Henry et al. | |
| 2015/0312858 A1 | 10/2015 | Kerai | |
| 2015/0319555 A1 | 11/2015 | Cordeiro | |
| 2015/0327596 A1 | 11/2015 | Alarcon et al. | |
| 2015/0358759 A1 | 12/2015 | Jakusovszky et al. | |
| 2016/0021488 A1 | 1/2016 | Viswanadham | |
| 2016/0029148 A1 | 1/2016 | Jackson | |
| 2016/0029149 A1 | 1/2016 | Morkiawa | |
| 2016/0037012 A1 | 2/2016 | Okado | |
| 2016/0037566 A1 | 2/2016 | Jakusovszky | |
| 2016/0100276 A1 | 4/2016 | Viswanadham et al. | |
| 2016/0100311 A1* | 4/2016 | Kumar | H04W 12/10 726/7 |
| 2016/0105761 A1* | 4/2016 | Polo | H04W 4/80 455/41.2 |
| 2016/0184635 A1 | 6/2016 | Kwon | |
| 2016/0191642 A1 | 6/2016 | Acar | |
| 2016/0278435 A1 | 9/2016 | Choukroun et al. | |
| 2016/0338407 A1 | 11/2016 | Kerdemelidis | |
| 2016/0363570 A1 | 12/2016 | Blackley | |
| 2016/0363917 A1 | 12/2016 | Blackley | |
| 2017/0020188 A1 | 1/2017 | Cameron | |
| 2017/0026905 A1 | 1/2017 | Denboer et al. | |
| 2017/0041868 A1 | 2/2017 | Palin et al. | |
| 2017/0093960 A1 | 3/2017 | Cameron | |
| 2017/0093981 A1 | 3/2017 | Cameron | |
| 2017/0118292 A1 | 4/2017 | Xiang | |
| 2017/0193816 A1 | 7/2017 | Lee et al. | |
| 2017/0273358 A1 | 9/2017 | Batista et al. | |
| 2018/0132102 A1 | 5/2018 | Kwon et al. | |
| 2018/0270311 A1* | 9/2018 | Baker | A61M 15/06 |
| 2018/0270643 A1* | 9/2018 | Baker | H04W 8/005 |
| 2018/0280640 A1 | 10/2018 | Baker et al. | |
| 2018/0286208 A1 | 10/2018 | Baker et al. | |
| 2018/0303163 A1 | 10/2018 | Baker et al. | |
| 2019/0286456 A1 | 9/2019 | Baker et al. | |
| 2020/0029371 A1* | 1/2020 | Achtien | G06F 13/102 |
| 2020/0237014 A1 | 7/2020 | Lee et al. | |
| 2020/0315254 A1 | 10/2020 | Zielazek et al. | |
| 2021/0308392 A1 | 10/2021 | Alarcon et al. | |

FOREIGN PATENT DOCUMENTS

| | | |
|---|---|---|
| CN | 101800575 A | 8/2010 |
| CN | 102035574 A | 4/2011 |
| CN | 102684753 A | 9/2012 |
| CN | 102970885 A | 3/2013 |
| CN | 103798960 A | 5/2014 |
| CN | 203913385 U | 11/2014 |
| CN | 104412629 A | 3/2015 |
| CN | 104488348 A | 4/2015 |
| CN | 104664605 | 6/2015 |
| CN | 104811895 A | 7/2015 |
| CN | 104955508 A | 9/2015 |
| CN | 104980284 A | 10/2015 |
| CN | 105210420 A | 12/2015 |
| CN | 106102811 A | 11/2016 |
| CN | 106604655 A | 4/2017 |
| CN | 107251583 A | 10/2017 |
| EP | 1357712 A1 | 10/2003 |
| EP | 1494403 A3 | 9/2009 |
| EP | 2110034 A1 | 10/2009 |
| EP | 2533477 A1 | 12/2012 |
| EP | 2533477 B1 | 3/2014 |
| EP | 2739020 A2 | 6/2014 |
| GB | 2521224 A | 6/2015 |
| JP | 2001352377 A | 12/2001 |
| JP | 2002044730 A | 2/2002 |
| JP | 2002247097 A | 8/2002 |
| JP | 2003229782 A | 8/2003 |
| JP | 2005236819 A | 9/2005 |
| JP | 2007036421 A | 2/2007 |
| JP | 2009252002 A | 10/2009 |
| JP | 2013524835 A | 6/2013 |
| JP | 2014110635 A | 6/2014 |
| JP | 2015180214 A | 10/2015 |
| JP | 2017169185 A | 9/2017 |
| JP | 2020526222 A | 8/2020 |
| JP | 2021506296 A | 2/2021 |
| JP | 2021523685 A | 9/2021 |
| KR | 20020057207 A | 7/2002 |
| KR | 20150032188 A | 3/2015 |
| KR | 101570106 B1 | 11/2015 |
| KR | 20150140584 A | 12/2015 |
| RU | 2420901 C2 | 6/2011 |
| RU | 2011120430 A | 11/2012 |
| RU | 2536166 C2 | 12/2014 |
| RU | 2598568 C2 | 9/2016 |
| RU | 2620754 C2 | 5/2017 |
| RU | 2636917 C2 | 11/2017 |
| RU | 2638917 C2 | 12/2017 |
| TW | 201513524 | 4/2015 |
| TW | 201613524 A | 4/2016 |
| WO | WO-2005057956 A1 | 6/2005 |
| WO | WO-2014060269 A1 | 4/2014 |
| WO | WO-2014085719 A1 | 6/2014 |
| WO | WO-2014150704 A2 | 9/2014 |
| WO | WO-2014195805 A2 | 12/2014 |
| WO | WO-2015099751 A1 | 7/2015 |
| WO | WO 2016/017909 | 2/2016 |
| WO | WO2016037012 | 3/2016 |
| WO | WO 2016/108646 | 7/2016 |
| WO | WO-2017020188 A1 | 2/2017 |
| WO | WO-2017051173 A1 | 3/2017 |
| WO | WO2017051174 | 3/2017 |
| WO | WO-2017055795 A1 | 4/2017 |
| WO | WO-2017055801 A1 | 4/2017 |
| WO | WO-2017055802 A1 | 4/2017 |

OTHER PUBLICATIONS

IEEE 802.15, IEEE 802.15 WPAN Task Group 1 (TG1), 2 pages, as retrieved on Mar. 15, 2016.
Written Opinion, Application No. PCT/EP2018/061086, dated Apr. 10, 2019, 8 pages.

(56) References Cited

OTHER PUBLICATIONS

Second Written Opinion, Application No. PCT/EP2018/061086, dated Jul. 23, 2019, 8 pages.
International Search Report and Written Opinion, Application No. PCT/EP2018/061086, dated Jul. 11, 2018, 14 pages.
Application and File History for U.S. Appl. No. 15/762,018, filed Mar. 21, 2018, 446 pages, Inventor: Baker.
Application and File History for U.S. Appl. No. 15/762,021, filed Mar. 21, 2018, Inventor: Baker, 442 pages.
Bluetooth, "Specification of the Bluetooth System: Experience More", Specification vol. 1, Covered Core Package version: 4.0, Jun. 30, 2010, 137 pages.
Bronzi W., et al., "Bluetooth Low Energy for Inter-Vehicular Communications", IEEE Vehicular Networking Conference, Dec. 3, 2014, pp. 215-221.
Decision of grant for Russian Application No. 2019134027 dated Aug. 18, 2020, 10 pages.
Decision to Grant dated Apr. 3, 2019 for Russian Application No. 201810957808, 12 pages.
Decision to Grant dated Dec. 13, 2018 for Russian Application No. 201810978608, 10 pages.
Extended European Search Report for Application No. 20204701.5, dated Jan. 28, 2021, 8 pages.
IEEE Standard for Local Metropolitan Area Networks, Part 15.4: Low-Rate Wireless Personal Area Networks (LR-WPANs), IEEE Std 802.15.4, Sep. 5, 2011,314 pages.
International Preliminary Report on Patentability for Application No. PCT/EP2018/061086, dated Oct. 10, 2019, 15 pages.
International Preliminary Report on Patentability for Application No. PCT/EP2018/086624, dated Mar. 16, 2020, 15 pages.
International Preliminary Report on Patentability for Application No. PCT/GB2016/052939, dated Sep. 14, 2017, 9 pages.
International Preliminary Report on Patentability for Application No. PCT/GB2016/052940, dated Sep. 14, 2017, 8 pages.
International Preliminary Report on Patentability, for Application No. PCT/EP2018/086791, dated Mar. 12, 2020, 13 pages.
International Search Report and Written Opinion for Application No. PCT/EP2018/086624, dated Feb. 11, 2019, 13 pages.
International Search Report and Written Opinion for Application No. PCT/GB2016/052939, dated Nov. 18, 2016, 17 pages.
International Search Report and Written Opinion for Application No. PCT/GB2016/052940, dated Dec. 8, 2016, 12 pages.
International Search Report and Written Opinion, for Application No. PCT/EP2018/086791, dated Feb. 13, 2019, 14 pages.
Liu Y., et al., "A Bluetooth Scatternet-Route Structure for Multihop Ad Hoc Networks", IEEE Journal on Selected Areas in Communications, Feb. 1, 2003, vol. 21 No. 2, pp. 229-239.
Office Action dated Nov. 21, 2019 for Chinese Application No. 201680047153.9, 12 pages.
Office Action for Application No. 16775827.5, dated Jan. 28, 2019, 5 pages.
Office Action for Japanese Application No. 2018-513274, dated Jan. 31, 2019, 2 pages (4 pages with translation).
Office Action for Japanese Application No. 2018-513357, dated Jan. 29, 2019, 3 pages (7 pages with translation).
Office Action For Japanese Application No. 2020-530641, dated Aug. 17, 2021, 5 pages.
Office Action For Japanese Application No. 2020-531510, dated Sep. 21, 2021, 5 pages.
Office Action For Russian Application No. 2020120938, dated Nov. 11, 2020, 13 pages.
Office Action for Russian Application No. 2020121494, dated Nov. 18, 2020, 6 pages.
Office Action for Russian Application No. 2020135708, dated May 24, 2021, 16 pages.
Office Action dated Apr. 21, 2021 for Korean Application No. 10-2020-7018465, 11 pages.
Office Action dated Jul. 30, 2020 for Korean Application No. 10-2019-7032414 filed Oct. 31, 2019, 11 pages.
Partial Search Report dated Feb. 18, 2016 for Great Britain Application No. GB1516673.9, 4 pages.
Search Report dated Dec. 13, 2018 for Russian Application No. 201810978608, 2 pages.
Search Report dated Feb. 18, 2016 for Great Britain Application No. GB1516674.7, 5 pages.
Written Opinion of International Preliminary Authority for Application No. PCT/EP2018/086624, dated Nov. 25, 2019, 6 pages.
Application and File History for U.S. Appl. No. 15/733,325, filed Jun. 26, 2020, inventor Darryl Baker et al.
Application and File History for U.S. Appl. No. 15/733,324, filed Jun. 26, 2020, inventor Patrick Moloney et al.
Application and File History for U.S. Appl. No. 15/762,021, filed Mar. 21, 2018, inventor Darryl Baker et al.
Application and File History for U.S. Appl. No. 15/762,018, filed Mar. 21, 2018, inventor Darryl Baker et al.
Office Action For Chinese Application No. 201880029165.8, dated Mar. 16, 2022, 16 pages.

* cited by examiner

METHOD AND AN AEROSOL DELIVERY DEVICE FOR TRANSMITTING AEROSOL DELIVERY DEVICE INFORMATION

PRIORITY CLAIM

The present application is a National Phase entry of PCT Application No. PCT/EP2018/061086, filed May 1, 2018, which claims priority from GB Patent Application No. 1707050.9, filed May 3, 2017, each of which is hereby fully incorporated herein by reference.

BACKGROUND

The present disclosure relates to data communication and in particular but not exclusively to a method and apparatus for communication from an aerosol delivery device using connectionless communication link packets.

In the use of aerosol delivery devices such as electronic nicotine delivery devices (sometimes known as e-cigarettes), there can be information gathered by the device relating to the status of that device. This information may be information that is useful to a user of an aerosol delivery device such as an electronic nicotine delivery ("END") device in relation to information such as battery charge level or information relating to remaining nicotine source level such as a puff count and/or total puff duration value. In addition information such as error codes may be generated by the device. Further, there may be information useful to a user aiming to regulate his or her reliance upon nicotine. Such information may also be of use to some form of administrator entity, for example allowing logging of numbers and types of error occurrences. The inventors have devised approaches for accessing such information in an energy-efficient and non-intrusive manner.

Methods of transferring data using low power communications protocols such as Bluetooth™ or Bluetooth Low Energy (BTLE), also known as Bluetooth Smart, often involve establishing a partnership, bonding, pairing or other connection-based channel between two entities to facilitate transmitting information over that protocol.

US 2016/0184635 describes a method and apparatus for transmitting and receiving data using Bluetooth.

US 2013/0065584 describes low energy beacon encoding.

TW201513524A describes monitoring system of physiological information following Bluetooth low energy protocol.

US 2015/0319555 describes method and apparatus for Bluetooth-based Wi-Fi synchronization.

US 2015/0172391 describes method, apparatus and computer program product for network discovery.

US 2016/0029149 describes lower power consumption short range wireless communication system.

WO 2016/037012A describes measuring health and fitness data using proximity sensors and mobile technologies.

US 2016/0021488 describes range management with Bluetooth low energy.

US 2015/0312858 US2015/312858 describes method and apparatus for generating a Bluetooth low energy data packet comprising audio payload.

US 2016/0037566 describes method and system for optimized Bluetooth low energy communications.

US 2011/0021142 describes method and system for a dual-mode Bluetooth low energy device.

US 2013/0178160 describes systems for facilitating wireless communication and related methods.

WO 2016/108646A describes method and apparatus for controlling device using Bluetooth LE technique.

WO 2016/017909A describes method and apparatus for controlling electronic device in wireless communication system supporting Bluetooth communication.

CN104664605A describes intelligent electronic cigarette with wireless Bluetooth low-power-consumption communication function.

SUMMARY

Particular aspects and embodiments are set out in the appended independent and dependent claims.

Viewed from one perspective, there can be provided a method and apparatus for communication from an electronic nicotine delivery device using a connectionless communication link packets.

In a particular approach, there can be provided a method for an aerosol delivery device. The method can comprise storing, during use of the aerosol delivery device and in a memory of the aerosol delivery device, information recording usage characteristics of the aerosol delivery device. The method can also comprise creating, using a wireless communication interface of the aerosol delivery device, a connectionless-state advertising packet that includes information relating to an identity and advertising state of the aerosol delivery device and a first set of information recording usage characteristics of the aerosol delivery device from the memory; and transmitting the advertising packet via the wireless communication interface. The method can further comprise: receiving a connectionless-state request packet from a remote wireless device, via the wireless communication interface; and responsive to receiving the request packet, creating, using the wireless communication interface, a connectionless state response packet that that includes a second set of information recording usage characteristics of the aerosol delivery device from the memory. Thereby an aerosol delivery device may be provided such as to be operable to interact with a data gathering or logging entity so as to enable usage information to be gathered and used, for example, for proactive and/or predictive interaction with the device or user where issues may have occurred or be expected to occur. Other analytics purposes are also possible.

In some example, the aerosol delivery device is an electronic nicotine delivery device. Thereby an electronic nicotine delivery device and user may benefit from the techniques described herein.

In some examples, the wireless communication interface utilizes an IEEE802.11 or IEEE802.15-derived wireless communication protocol. In one example, the wireless communication interface is a Bluetooth or BTLE interface. Thereby the approach can make use of standardized communications interfaces and modules to provide the techniques described herein using commonly-deployed communications technologies.

In some examples, the connectionless state advertising packet comprises a payload which includes the first set of information recording usage characteristics, wherein the first set of information recording usage characteristics comprises one or more values selected from the group comprising: battery properties, aerosol generation properties, aerosol medium properties, aerosol generation event properties, and erroneous or abnormal behavior properties. Thereby the present approach may be used to base data logging, reporting and/or predictive activity on specific measurable and indicative properties of the particular aerosol delivery device.

In some examples, the connectionless state response packet comprises a payload which includes the second set of information recording usage characteristics, wherein the second set of information recording usage characteristics comprises one or more values selected from the group comprising: battery properties, aerosol generation properties, aerosol medium properties, aerosol generation event properties, and erroneous or abnormal behavior properties. Thereby the present approach may be used to base data logging, reporting and/or predictive activity on specific measurable and indicative properties of the particular aerosol delivery device.

In some examples, the connectionless state response packet further includes information relating to an identity of the aerosol delivery device. Thereby, the logging, reporting and/or predictive activity can be individualized to a particular device.

In some examples, at least one of the first set of information recording usage characteristics and the second set of information recording usage characteristics are arranged in the payload according to a predetermined schema defining the order and size of the values included in the payload. Thereby, the present approach may be able to communicate in a standardized way that facilitates efficient data communication with minimal overhead.

In another particular approach, there can be provided an aerosol delivery device, comprising: a memory configured to store, during use of the aerosol delivery device, information recording usage characteristics of the aerosol delivery device; and a wireless communication interface configured to transmit, a connectionless-state advertising packet that includes information relating to an identity and advertising state of the aerosol delivery device and a first set of information recording usage characteristics of the aerosol delivery device from the memory. The wireless communication interface can be further configured to receive a connectionless-state request packet from a remote wireless device; and to transmit a connectionless state response packet that that includes a second set of information recording usage characteristics of the aerosol delivery device from the memory. Thereby an aerosol delivery device may be provided such as to be operable to interact with a data gathering or logging entity so as to enable usage information to be gathered and used, for example, for proactive and/or predictive interaction with the device or user where issues may have occurred or be expected to occur. Other analytics purposes are also possible.

Such a device can include elements or configuration to enable it to perform in accordance with the various method examples outlined above.

In a further particular approach, there can be provided a system comprising: the aerosol delivery device outlined above; and a remote wireless device. The remote wireless device can comprise: a wireless communication interface configured to receive the connectionless-state advertising packet from the aerosol delivery device, to transmit the connectionless-state request packet, and to receive the connectionless state response packet.

BRIEF DESCRIPTION OF FIGURES

Embodiments of the present teachings will now be described, by way of example only, with reference to accompanying drawings, in which:

FIG. 1 schematically illustrates an advertising protocol.

FIG. 2 schematically illustrates an example devices environment.

FIG. 3 schematically illustrates messages between devices.

FIG. 4 schematically illustrates a message.

FIG. 5 schematically illustrates a message payload.

FIG. 6*a* schematically illustrates a first message schema.

FIG. 6*b* schematically illustrates a second message schema.

FIG. 7 schematically illustrates an aerosol delivery device.

FIG. 8 schematically illustrates a logging device.

While the presently described approach is susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope as defined by the appended claims.

DETAILED DESCRIPTION

The present disclosure relates to a modified form of wireless communication behavior. According to the present teachings, a device can be configured to use a BTLE or BTLE-like communications protocol to achieve connectionless sharing of information relating to END device status and/or usage.

In the present examples, the aerosol delivery devices use BTLE, but other Bluetooth protocols or Bluetooth-like protocols can take advantage of the present teachings. Bluetooth is a wireless technology standard for short distance communication between appropriately enabled devices. BTLE is a variant on the original Bluetooth system, designed to draw less power in use for extended battery life and/or small battery applications. Both Bluetooth and BTLE operate in the UHF radio industrial, scientific and medical (ISM) band from 2.4 to 2.485 GHz and are designed for creating so-called wireless personal area networks (PANs) for interconnecting devices over short distances. BTLE uses a modified version of the Bluetooth stack for communication such that a BTLE device and a traditional Bluetooth device are not directly compatible unless one device implements both protocols. Both Bluetooth and BTLE standards are maintained by the Bluetooth Special Interest Group (SIG). The present disclosure is provided in the context of a BTLE implementation using the part of the Bluetooth v4 specification that relates to BTLE. However, the skilled reader will appreciate that the present teachings can be applied to other Bluetooth approaches, such as the so-called Classic Bluetooth definitions that are also set out in the Bluetooth v4 specification. It will be further appreciated that the present teachings can be applied to technologies that are not in accordance with an entire Bluetooth specification, but which nevertheless behave in a Bluetooth-like manner.

For example, non-Bluetooth systems that nevertheless use an advertising setup based on the BTLE Generic Access Profile (GAP) and thus have an advertising structure substantially as set out in FIG. 1 would be able to deploy the techniques of the present teachings. FIG. 1 illustrates an advertising structure according to which a peripheral (or slave or remote or secondary) device advertises its availability as a peripheral (or slave or remote or secondary) device during an advertisement period, with the advertisement periods being separated by an advertisement interval. The advertisement may include data for transmission, an indication that there is data for transmission or have no data reference at all. To receive the advertisement, a central (or primary or control) device scans for advertisements during a scan window. Multiple scan windows are separated by a scan interval. The relative duration of the scan and advertisement intervals is altered, either by determining that the interval at one device type is constant while the other varies, or by determining that both vary, which determination can be set by a standard or rule set for implementing the advertising protocol. By providing this relative variation in the scan and advertisement intervals, it is provided that even where an initial advertisement period does not overlap with an initial scan window, after a number of advertisement and scan intervals, an advertisement period will occur which overlaps with a scan window such that a connection can be initiated between the central and the peripheral device.

Figure 2:
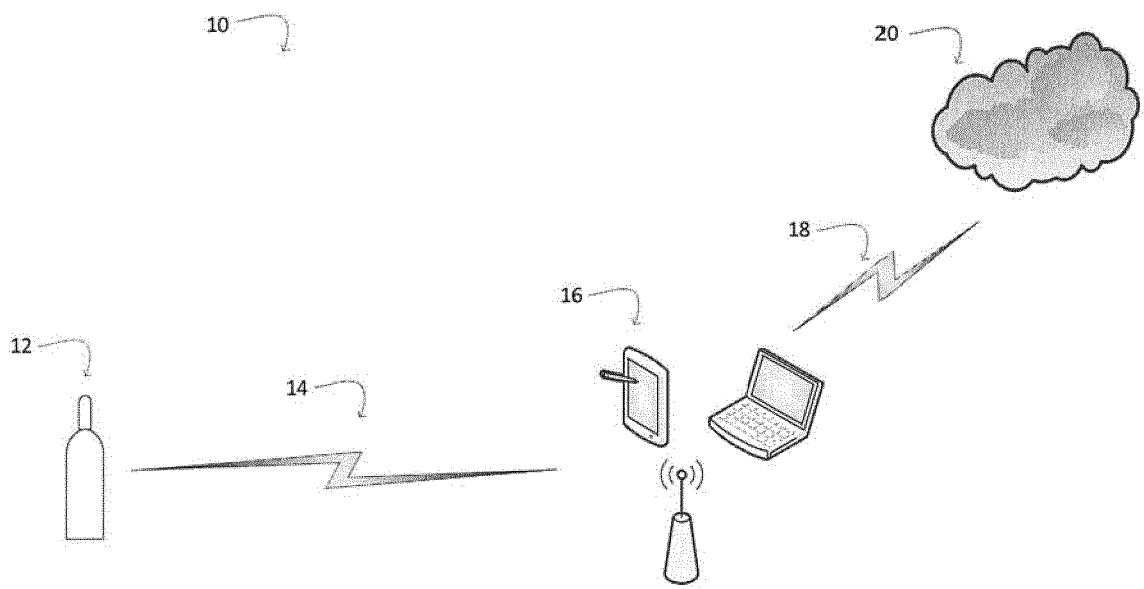

A first example of a devices environment 10 in which the present teachings can be utilized is shown in FIG. 2. In this example, an aerosol delivery device 12 is operable to communicate with a logging device 16 via a communication channel 14. Further, in some examples, the logging device 16 may be operable to communicate via a communication channel 18 with a remote network service 20.

As discussed above, the aerosol delivery device 12 may be and END device. The logging device 16 may be any suitable device having compatibility with the wireless communication channel 14. As illustrated in FIG. 2, the logging device 16 may for example comprise one or more of a communication access station, such as a base station or similar device for the wireless communication channel 14. The logging device 16 may also or alternatively comprise a computing device such as a tablet computer, smartphone, portable computer, desktop computer, server or other multipurpose computing device including or attached to an interface for the wireless communication channel 14.

In the present example, the wireless communication channel 14 is a BTLE or BTLE-like channel which transfers data packets between the aerosol delivery device 12 and the logging device 16 using a connectionless state of a communication protocol or a connectionless communication protocol.

The communication channel 18 between the logging device 16 and the remote network service 20 may be a wired and/or wireless channel and may use the same or different network protocols as the wireless communication channel 14. In the present examples, the communication channel 18 may be a conventional network data connection such as a WI-FI (IEEE802.11x) or Ethernet-based connection, for example using conventional network transport and data protocols such as TCP/IP, Fiberchannel and Infiniband.

The remote network service 20 may be accessed via a public or private network such as a WAN or the Internet. The remote network service 20 may be provided on dedicated or shared network resources as a public or private cloud service.

Using the structure illustrated in FIG. 2, the aerosol delivery device 12 may provide various usage and/or status data about that device to one or more logging devices 16 using a connectionless transmission arrangement, i.e. without a formal bonding, pairing or other connection establishment process. This may facilitate straightforward and non-intrusive collection of data from the aerosol delivery device 12. Therefore, the aerosol delivery device can be enabled to automatically collect and collate usage/status data and then provide this to the logging device, which can identify and extract the data from the aerosol delivery device and if necessary process this data into an information format for use in logging and/or analyzing the data. The data from the aerosol delivery device may be further forwarded/uploaded to the remote network service for centralized handling of the information conveyed by the data.

An approach for sending and receiving data packets between the elements illustrated in FIG. 2 is shown in FIG. 3. In FIG. 3, it is illustrated that the aerosol delivery device 12 sends out an advertising packet, identified as ADV_IND in FIG. 3 (in BTLE terminology, a device listening for advertising packets is termed a "peripheral" device). The ADV_IND packet is not directed to a particular other device, but can be received and read by any device within transmission range that is listening for advertising packets (in BTLE terminology, a device listening for advertising packets is termed a "central" device). This packet provides advertising function for the sending device, setting out sufficient identity details of the sending device that a receiving device can construct a response packet that identifies the sending device in such manner that the sending device will understand that it is the intended recipient of the response packet. The ADV_IND packet may also be connectable, in the sense that it can be used as the first stage in a process of establishing a connection (such as a bonding or pairing connection) between the sending device and a receiving device. In the present example however, such connectable capability is not utilized to achieve the transmission of the aerosol delivery device status/usage data.

The logging device 16, upon receipt of the ADV_IND packet from the aerosol delivery device 12 uses the identification information from the ADV_IND packet to send a reply to the aerosol delivery device 12 in the form of a request packet, identified as SCAN_REQ in FIG. 3. This packet requests further information from aerosol delivery device.

When the aerosol delivery device 12 receives the SCAN_REQ packet, it then generates and transmits a response packet, identified as SCAN_RSP in FIG. 3, directed to the logging device 16. From the point of view of the aerosol delivery device 12, the logging device 16 may be considered as a remote wireless device, as the aerosol delivery device 12 may be agnostic as to the exact nature of any other device with which it exchanges advertising packets. Optionally, there may be an onward transmission by the logging device 16 of the status/usage data received the aerosol delivery device. This onward transmission may be directed to a remote network service 20 and is illustrated as [upload] in FIG. 3.

Once the SCAN_RSP packet is received by the logging device 14, the exchange of packets between the aerosol deliver device 12 and the logging device 16 is complete. It is possible for this process to be complete at this time as the present techniques actually provide the aerosol delivery device usage/status data within the ADV_IND and SCAN_RSP packets.

In the present example, each of the ADV_IND and SCAN_RSP packets has a packet structure that includes space for payload information. This payload information space is used by the present techniques to convey the aerosol delivery device usage/status data. Detailed examples of packet structures will now be described with reference to the BTLE packets, although it will be appreciated that another transmission protocol or stack that provides for a similar advertising packet sequence with the capability for payload in the advertising and response packets can also be used to achieve the results of the present teachings.

Figure 3:
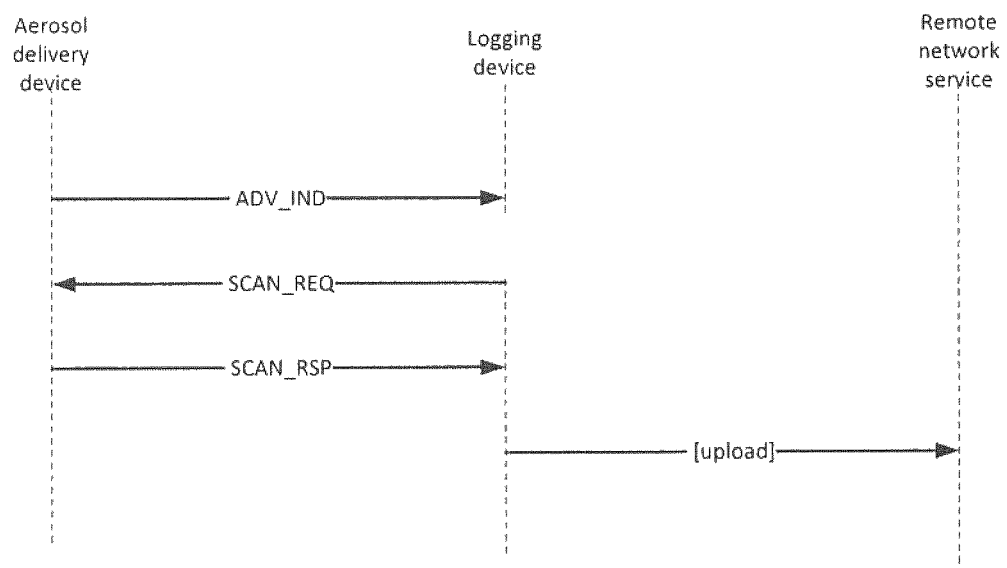
Figure 4:

The packet structure used by the ADV_IND and SCAN_RSP packets discussed with respect to FIG. 3 above includes a preamble, an access address, a packet data unit and an error check code. A typical example structure is shown in FIG. 4. According to the usual BTLE packet structures, the preamble has a size of 1 byte and is used for internal protocol management. The Access Address has a size of 4 bytes and is set to a fixed predetermined value for advertising packets. The Packet Data Unit (PDU) is a payload space that can be used to carry additional information, and has a size in the range of 2 to 39 bytes. The error check code (ECC) is used as an error check coding and typically is based upon a cyclical redundancy check (CRC) calculated from the other bits of the packet.

Figure 5:

The structure of the Packet Data Unit is illustrated in FIG. 5. As shown, there is provided a PDU Header and a Payload. The PDU Header has a length of 2 bytes and includes details of the packet type (i.e. in the present examples the packet type identifiers used are those for ADV_IND, SCAN_REQ, and SCAN_RSP). The header may also include details of the payload length, as the payload can have variable length.

The actual data payload is then included in the payload, which can have a size of up to 37 bytes. The payload includes the address of the sending device (the aerosol delivery device 12 in the case of ADV_IND and SCAN_RSP packets). This takes up 6 bytes of the maximum payload size. The payload may also include a destination address where applicable (e.g. in SCAN_RSP the address of the logging device 16 that sent the SCAN_REQ), this also is expected to take up 6 bytes of the maximum payload size.

The remaining bytes of payload space (a maximum of 31 bytes as the other 6 bytes of the maximum PDU size are used for the address of the sending device) in an ADV_IND packet may typically be used to may contain advertising data from the advertiser's host, such as advertising services and a convenient device name. In the present approaches, the remaining payload space is, instead of advertising data about the advertiser, controlled to carry data gathered from the device in use, which data describe the aerosol delivery device usage and/or status. Thus this usage/status information may be conveyed without the need to establish a formal connection (such as a pairing or bonding connection) between the aerosol delivery device and the logging device. The payload of both the ADV_IND and SCAN_RSP can be controlled in this way.

Various examples of data fields about an aerosol delivery device 12 such as an END device that may have utility in managing or receiving reporting from the aerosol delivery device 12 by the logging device 16 and/or a remote network service 20 are now set out:

Puff Count (the number of aerosol delivery operations carried out by the device, definable as total operations for the device or operations since a change event such as a new aerosol content cartridge being inserted)

Puff Duration (the average duration or total summed duration of aerosol delivery operations, typically over the same duration as the Puff Count)

Battery Charges (the number of battery charge/discharge cycles carried out on the device)

Average Battery percentage before charge (an indication of the average percentage charge value at the time that a charge is commenced)

Overheat Protection (the number of times that overheat protection function has been engaged in the device)

Error Codes (any error codes currently indicated by the device and/or an occurrence history of error codes in the device)

Puff too Short (an indication of aerosol delivery operations that fall below a threshold duration to ensure that aerosol content is actually delivered)

Cartomizer Used (an indication of an aerosol content cartridge currently installed in the device)

Puffs per power profile (a count of aerosol delivery operations for each of a number of different power profiles, for example high, medium and low)

Current Power Settings (an indication of current power settings as presently set for use in a next aerosol delivery operation)

Charged duration (an indication of the length of time for which the device has held sufficient charge for aerosol delivery operations)

Battery Threshold before charge (an indication of remaining battery charge, expressed as a percentage, hours of standby, and/or number of aerosol delivery operations at present power settings, etc.)

Boot/Uptime Time(s) (an indication of a number of power-on cycles and/or a duration of power on status)

Product Type (an identifier of a product type of the device)

Batch Number (an identifier of a batch number of the device)

Serial Number (an identifier of a serial number of the device)

Duration of Device On time (an indication of a duration of power on status)

Duration of Device Off time (an indication of a duration of power off status)

Device/Coil temperature (an indication of a current and/or history of the device temperature and/or a temperature of a heater coil used for aerosol generation)

As will be appreciated, a wide variety of such fields relating to the current and historical usage/status of the device may be created and used depending on the requirements of the aerosol delivery device, logging device and/or remote network service. For example, in an arrangement where an application provided at the logging device and/or remote network service is concerned with successful operation of the device and providing error feedback to a user or administrator, then fields relating to error codes, physical status (temperature, battery, uptime etc) and device identity (product, batch, serial, etc.) may be emphasized. In an arrangement where an application provided at the logging device and/or remote network service is concerned with analyzing usage statistics, then fields relating to aerosol delivery activity (puff count, puff duration, puffs per power, charge duration etc) may be emphasized. However, in order to enable applications with a range of content interests and emphases to operate successfully with the aerosol delivery device without introducing a requirement for detailed data requests of a type that might encourage or require a connection to be established with the aerosol delivery device, the aerosol delivery device may be preconfigured (for example at manufacture, sale or post-sale by a user interface provided by an application that does connect using a connection-based exchange of setting information with the device) to provide any or all possible data fields when advertising using ADV_IND packets and when replying to a SCAN_REQ packet with a SCAN_RSP packet.

Figure 6A:
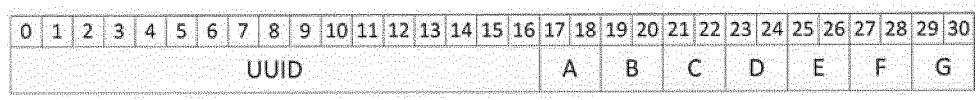
Figure 6B:
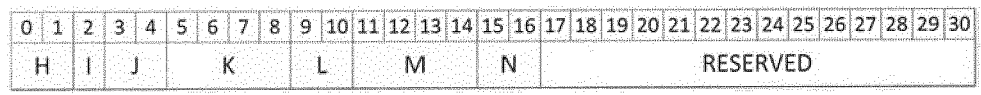

Thus the present teaching also provides for such fields to be transmitted within the combination of the ADV_IND and SCAN_RSP packets. Examples of one possible schema for including fields for the device status/usage in the payload of ADV_IND and SCAN_RSP packets is illustrated in FIGS. 6a and 6b. In FIG. 6a, the ADV_IND payload content commences with a UUID (Universally Unique Identifier). Each device subscribing to the communication protocol (BTLE in the present examples) has an identifier that identifies that device as being distinct from any other. In the present examples (consistent with the definition in BTLE) the UUID has a length of 128 bits—this creates a maximum pool of 2128 possible unique devices. The payload of the ADV_IND packet then includes 7 fields of up to 2 bytes each in length. In one example, these may be assigned as follows: A—Product/Batch ID, B—Puff Count, C—Error Codes, D—Puffs in high power, E—Puffs in medium power, and G—Puffs in low power.

In FIG. 6a, the SCAN_RSP payload content includes a further 7 fields which are illustrated as having varying lengths. In one example, these may be assigned as follows: H—Total Battery Charges, I—Average battery percentage before charge, J—time since last charge, K—time since last power-on cycle, L—puff duration, M—time spent charging, N—total overheat events. In addition, some space is indicated as reserved (i.e. unused in this example schema) but which could be used in an alternative schema.

By defining the schema of field delivery within the ADV_IND and SCAN_RSP packets in advance, the receiving logging device can interpret the data meaning according to the data position within the packet payload. This permits high efficiency use of the limited data space within the packets. The schema may be fixed for the life of the device, or may be modifiable either by a systems implementer or a user.

It will be appreciated that the present approach involves transmission of the data from the aerosol delivery device 12 to the logging device 16. Therefore, to illustrate suitable devices for providing such transmission of data, an example aerosol delivery device and an example logging device are illustrated with respect to FIGS. 7 and 8 respectively.

Figure 7:
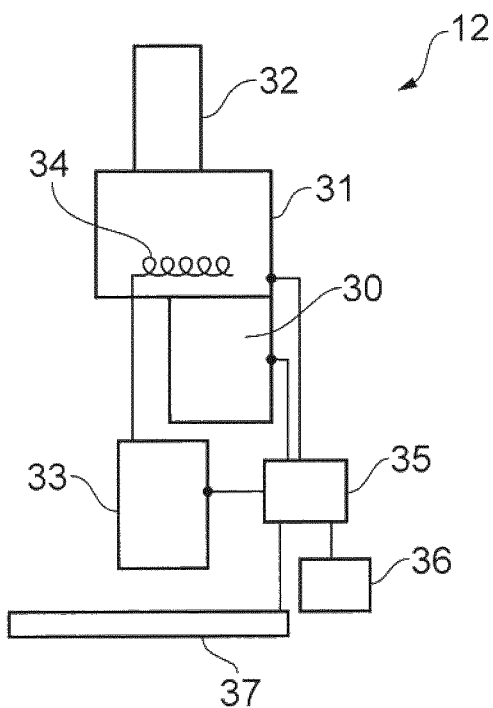

An example of an aerosol delivery device 12 is schematically illustrated in FIG. 7. As shown, the aerosol delivery device 12 is a device which contains elements relating to aerosol generation such as an aerosol medium container or cartridge 30 (in the case of an END device, the aerosol medium container or cartridge 30 will contain nicotine or a nicotine-bearing formulation), an aerosol generation chamber 31 and an outlet 32 through which a generated aerosol may be discharged. A battery 33 may be provided which to power a thermal generator element (such as a heater coil 34) within the aerosol generation chamber 31. The battery 33 may also power a processor/controller 35 which may serve purposes of device usage, such as activation of the device for aerosol generation in response to an activation trigger, and purposes of device monitoring and reporting. Processor/controller 35 may have access to a memory 36 in which data collected or determined by the processor/controller can be stored pending transmission. The memory 36 may be internal to the processor/controller or may be provided as an addition separate physical element. To perform transmission of data stored in the memory 35, the processor/controller is provided with a transmitter/receiver element 37. In the present example, this is a BTLE interface element including a radio antenna for wireless communication.

As illustrated, processor 35 may be connected for example to aerosol medium container or cartridge 30, aerosol generation chamber 31 and battery 33. This connection may be to an interface connection or output from ones of the components and/or may be to a sensor located at or in ones of the components. These connections may provide access by the processor to properties of the respective components. For example a battery connection may provide an indication of current charge level of battery 33. By measuring the battery charge level over time, the controller/processor 35 may be able to determine and store values for any or all of data fields such as a current (i.e. most recent) battery level, an average minimum charge level reached before a recharge event, low battery conditions, and a total number of recharge events. As another example, a connection to aerosol medium container or cartridge may provide that the controller/processor 35 can determine and store values for any or all of data fields such as when a container or cartridge change occurs, an identifier of a currently fitted container or cartridge, and a current level of remaining aerosol medium. As a further example, a connection to aerosol generation chamber may provide that the controller/processor 35 can determine and store values for any or all of data fields including coil overtemperature events, coil activation events (representative of puff events), coil activation duration (representative of puff duration), etc. In addition, the processor/controller 35 can use an internal or external clock to make reference to events over time and thus determine and store data fields relating to measurements over time, and/or to determine and store data field relating to duration of individual events, and also to compare such durations to threshold in order to detect under- or over-duration aerosol generation events. Also, the processor/controller 35 can already know and store information on the device identifier, serial number etc, and also information on current power level settings to be applied for aerosol generation events. The processor/controller 35 can also be aware of the currently defined data transmission schema such that it can package the data into structures for transmission. Thus the aerosol delivery device 12 of the present examples can determine and store a variety of data relating to current and historical usage of the aerosol delivery device, and then package that data into a predefined data payload schema and include such packaged data in advertising messages and response messages to enable that data to be passed on to the logging device 16.

Figure 8:
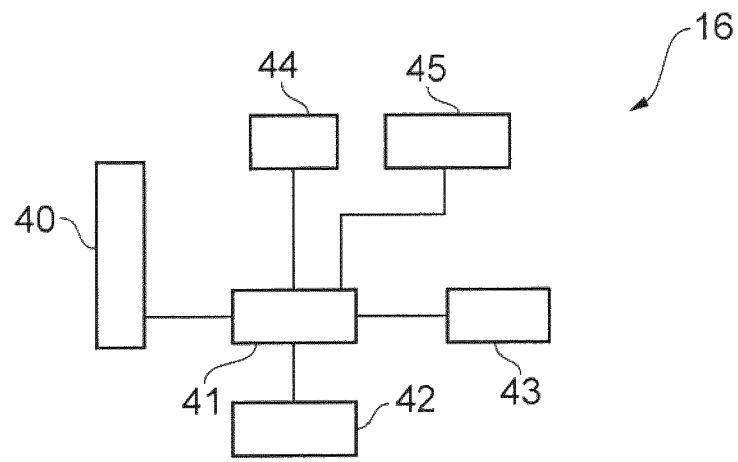

An example of a logging device 16 is schematically illustrated in FIG. 8. As shown, the logging device 16 includes a receiver transmitter element 40 for receiving advertising and response packets from the aerosol delivery device and for sending request packets to the aerosol delivery device. In the example where the aerosol delivery device uses a BTLE transmitter/receiver element, the receiver transmitter element 40 of the logging device 16 is also a BTLE capable or compatible element. The receiver transmitter element 40 is connected to a processor or controller 41 which can receive and process the data received from the aerosol delivery device. The processor or controller 41 has access to a memory 42 which can be used to store program information and/or data. The logging device 16 may be a dedicated logging device arranged with a principal purpose of receiving and recording data from aerosol delivery devices, such as may be referred to as a sniffer device or the like. In such an example, any program instructions for the processor or controller 41 may be related solely to performing the logging/sniffing functionality and any onward forwarding or transmission functionality. Alternatively, the logging device 16 may be a base station or similar device for the wireless communication channel 14, in which case the program instruction may relate to the logging/sniffing functionality and a base station functionality. In further alternatives, the logging device 16 may be a general purpose computing device such as a tablet computer, smartphone, portable computer, desktop computer, server or other multipurpose computing device, in which cases the application instructions for the processor or controller 41 may be general purpose operating system instructions and instructions for other applications installed to the device, where the logging/sniffing functionality is provided as an application operable by the device in addition to other programmed functionalities.

The logging device 16 may include a further data transmission interface 43. This interface may provide one or more interface functionalities, for example to a wired connection such as Ethernet, Infiniband or Fiberchannel and/or to a wireless connection such as Wi-Fi, Bluetooth or ZigBee, and or all of which may be compatible with the communication channel 18. This interface may be used where a particular implementation requires the capability for onward transmission of the data received from the aerosol delivery device 12 to a remote network service 20. The logging device may also include user interface elements such as an output device 44 (which may include one or more of a display, an audio output, and a haptic output) and/or an input device 45 (which may include one or more of buttons, keys, touch-sensitive display elements, or a mouse/trackpad).

The remote network service 20, if implemented, will include an interface capable of receiving data over the selected communication channel 18. The remote network service 20 may be include one or more compute resources and one or more storage resources, by use of which the remote network service may process the status/usage data of one or more aerosol delivery devices to provide reporting and/or control of an aerosol delivery devices estate. For example, the network service may provide centralised logging of types, frequencies and totals of error codes experienced by a number of aerosol delivery devices of a number of different product types and/or batches.

Processing of the data from the aerosol delivery device may be performed at either or both of the logging device 16 and the remote network service 20. Such processing may provide user-level and/or administrator-level information relating to one or more aerosol delivery devices. Such information can be provided to a user and/or administrator using a suitable user interface, such as a graphical user interface that may be displayed on a display device. User-level information could be used to provide feedback to a user on their personal usage habits, including the likes of how many aerosol generation events that have made over a given time period and/or at each of a number of power levels and/or using what aerosol medium. Such information may be of use to a user that is looking to regulate their aerosol medium intake to match (or exceed or not exceed) a personal goal or target of the user. Such information may also provide more information to a user of an aerosol generation device about their usage than was previously available. Administrator-level information could be used to provide product quality/reliability reporting by enabling a comparison of different products or batches of the same product against undesirable usage behavior such as overtemperature conditions or other error indicators. Such information could be fed back into a product design process to optimize reliability of future devices. Administrator-level information could also be used to identify market information or market trends, such as usage patterns of different aerosol medium containers or cartridges in aerosol delivery devices sold into different markets.

It is seen from the present examples that information provided by an aerosol delivery device containing the usage/status information may be transmitted in the open (i.e. without specific encryption). However, it is also noted that the information is anonymous in the sense that the only identifying information (UUID, product identifier, serial number, batch number etc) relates to the device rather than to the user. Also, the schema for data transmission does not require field labels to be included in the data packets, such that the packet data can in practice contain only one or more values for each filed in such a way that to the casual observer it contains nothing more than a random sequence of data bits. Further, as the schema can be in some examples modified as between the user and their device, each user may have a customized schema which prevents knowledge of a default schema from being able to identify the meaning of the data in the packets. Thus it is seen that transmission of the advertising and response packets is in fact secure despite not necessarily including a specific conventional security technique such as encryption.

It is however possible to implement the system of the present examples using encryption of the data is required (for example if the schema were modified to include data which the user of the aerosol device wished to keep protected, such as personal identifying data of the user). To do so, the aerosol delivery device and logging device can be caused to establish a connection which can be used to exchange suitable encryption keys for use by the aerosol delivery device when preparing the payload information for the advertising and response packets. Then, even after such connection has been stopped, the aerosol delivery device may use such encryption keys to encrypt the data in the payload, while also including in the payload an identifier (in the manner of a session key or similar) which identifies to the receiving logging device details of the encryption used so that the logging device can use the correct decryption key to access the transmitted data.

Thus there has been described a complete solution for gathering and providing aerosol delivery device status and/or usage information to a logging device through a connectionless exchange of data packets in which the information is passed using advertising and response packets sent from the aerosol delivery device.

It has been described above, that the technology used to implement the passing of data packets in a connectionless manner is achieved using BTLE ADV_IND and SCAN_RSP packets in a BTLE communications environment. It is also possible to use alternative technologies to achieve a similarly connectionless transfer of the aerosol delivery device usage/status data. As will be appreciated, BTLE is a subset of the Bluetooth specifications, which were originally defined within the IEEE802.15 framework. Other IEEE802.15 compliant or derived technologies (sometime references as personal area network or PAN technologies) such as (non-BTLE) Bluetooth (including Bluetooth 5, which no longer uses the "LE" designation), Zigbee or Z-Wave could be used to provide the connectionless transfer of the usage/status data. In addition, other wireless technologies such as Wi-FI (IEEE802.11n) or similar could be used to provide the connectionless transfer of the usage/status data.

As will be appreciated from the above discussion, both the aerosol delivery device 12 and the logging device 16 may be required to store data relating to the various usage/status fields in a memory of the respective device. On one implementation, this is performed by defining a static framework structure for memory usage in which particular field values are stored at particular predefined memory locations or at particular predefined locations within a data file format. Such a structure may also include a label or identifier for each field within the framework structure. In alternative implementations, either or both of the storage at the aerosol delivery device 12 and the logging device 16 may be arranged to store the data according to a dynamic allocation structure. This would avoid memory space being used for specific fields that are unused at any given point in time, but would require that the label or identifier for each field is used within the dynamic memory structure.

Therefore, the present teachings have provided an approach for gathering and providing data corresponding to a number of metrics representative of the usage or status of an aerosol delivery device. This is achieved without a need for device pairing or connection such that a user need not provide pre-configuration or ongoing interaction with the aerosol delivery device. The use of connectionless data transfer further avoids a need for user pre-configuration or ongoing interaction with the aerosol delivery device. At the same time, user configuration can be provided in specific implementations if appropriate.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the disclosure scope defined by the claims or limitations on equivalents to the claims, and that other embodiments may be utilized and modifications may be made without departing from the scope and/or spirit of the claims.

The invention claimed is:

1. A method for an aerosol delivery device, the method comprising:
storing, during use of the aerosol delivery device and in a memory of the aerosol delivery device, information recording usage characteristics of the aerosol delivery device;
creating, using a wireless communication interface of the aerosol delivery device, a connectionless-state advertising packet that includes information relating to an identity and an advertising state of the aerosol delivery device and a first set of information recording usage characteristics of the aerosol delivery device from the memory, wherein the connectionless state advertising packet comprises a first payload which includes the first set of information recording usage characteristics;
transmitting the connectionless-state advertising packet via the wireless communication interface;
receiving a connectionless-state request packet from a remote wireless device, via the wireless communication interface; and
responsive to receiving the connectionless-state request packet, creating, using the wireless communication interface, a connectionless-state response packet that includes a second set of information recording usage characteristics of the aerosol delivery device from the memory;
wherein a connectionless-state packet is a packet transmitted without a formal bonding, pairing or other connection establishment process, and
wherein the first set of information recording usage characteristics are arranged in the first payload according to a predetermined schema defining the order and size of the values included in the first payload.

2. The method of claim 1, wherein the aerosol delivery device is an electronic nicotine delivery device.

3. The method of claim 1, wherein the wireless communication interface utilizes an IEEE802.11 or IEEE802.15-derived wireless communication protocol.

4. The method of claim 3, wherein the wireless communication interface is a Bluetooth or BTLE interface.

5. The method of claim 1, wherein the first set of information recording usage characteristics comprises one or more values selected from: battery properties, aerosol generation properties, aerosol medium properties, aerosol generation event properties, and erroneous or abnormal behavior properties.

6. The method of claim 1, wherein the connectionless-state response packet comprises a second payload which includes the second set of information recording usage characteristics, wherein the second set of information recording usage characteristics comprises one or more values selected from: battery properties, aerosol generation properties, aerosol medium properties, aerosol generation event properties, and erroneous or abnormal behavior properties.

7. The method of claim 6, wherein the connectionless-state response packet further includes information relating to an identity of the aerosol delivery device.

8. The method of claim 5, wherein the second set of information recording usage characteristics are arranged in the second payload according to a predetermined schema defining an order and a size of the values included in the payload.

9. An aerosol delivery device, comprising:
a memory configured to store, during use of the aerosol delivery device, information recording usage characteristics of the aerosol delivery device;
a wireless communication interface configured to transmit a connectionless-state advertising packet that includes information relating to an identity and an advertising state of the aerosol delivery device and a first set of information recording usage characteristics of the aerosol delivery device from the memory, wherein the connectionless state advertising packet comprises a first payload which includes the first set of information recording usage characteristics, wherein the wireless communication interface is further configured to receive a connectionless-state request packet from a remote wireless device and to transmit a connectionless-state response packet that includes a second set of information recording usage characteristics of the aerosol delivery device from the memory;
wherein a connectionless-state packet is a packet transmitted without a formal bonding, pairing or other connection establishment process;
wherein the first set of information recording usage characteristics are arranged in the first payload according to a predetermined schema defining the order and size of the values included in the first payload.

10. The aerosol delivery device of claim 9, wherein the aerosol delivery device is an electronic nicotine delivery device.

11. The aerosol delivery device of claim 9, wherein the wireless communication interface utilizes an IEEE802.11 or IEEE802.15-derived wireless communication protocol.

12. The aerosol delivery device of claim 11, wherein the wireless communication interface is a Bluetooth or BTLE interface.

13. The aerosol delivery device of claim 9, wherein the first set of information recording usage characteristics comprises one or more values selected from: battery properties, aerosol generation properties, aerosol medium properties, aerosol generation event properties, and erroneous or abnormal behavior properties.

14. The aerosol delivery device of claim 9, wherein the connectionless-state response packet comprises a second payload which includes the second set of information recording usage characteristics, wherein the second set of information recording usage characteristics comprises one or more values selected from: battery properties, aerosol generation properties, aerosol medium properties, aerosol generation event properties, and erroneous or abnormal behavior properties.

15. The aerosol delivery device of claim 14, wherein the connectionless-state response packet further includes information relating to an identity of the aerosol delivery device.

16. The device of claim 13, wherein at least one of the first set of information recording usage characteristics or the second set of information recording usage characteristics are arranged in the second payload according to a predetermined schema defining an order and a size of the values included in the second payload.

17. A system comprising:
   the aerosol delivery device of claim 9; and
   a remote wireless device comprising:
      a wireless communication interface configured to:
         receive the connectionless-state advertising packet from the aerosol delivery device;
         transmit the connectionless-state request packet; and
         receive the connectionless state response packet.

* * * * *